United States Patent [19]

Iwamoto

[11] 4,296,939
[45] Oct. 27, 1981

[54] SPEED UP DEVICE FOR BICYCLE

[76] Inventor: Masaru Iwamoto, 98 Otsukawa-Hiedacho, Handa City, Aichi Prefecture, Japan

[21] Appl. No.: 10,838

[22] Filed: Feb. 9, 1979

[30] Foreign Application Priority Data

Jun. 2, 1978 [JP] Japan ............................ 53-75718[U]

[51] Int. Cl.³ .............................................. B62M 1/10
[52] U.S. Cl. .................................. 280/212; 301/37 SA
[58] Field of Search ................... 280/212, 217, 289 R, 280/289 D, 213; 180/7 P; 301/37 R, 37 SA, 6 V, 6 WB, 6 CS; D12/213, 204

[56] References Cited

U.S. PATENT DOCUMENTS

3,579,408 5/1971 Dowhan ........................ 301/37 SA

FOREIGN PATENT DOCUMENTS

177802 9/1935 Switzerland ........................ 280/212
10022 8/1891 United Kingdom ................ 280/213
17755 9/1904 United Kingdom ................ 280/213

*Primary Examiner*—John A. Pekar
*Attorney, Agent, or Firm*—Fred Philpitt

[57] ABSTRACT

A speed up device for insertion between the spokes of bicycle wheels formed by bonding two plate members together so that the top and front portions of the device will have a narrow edge while the bottom and rear portions of the device diverge outwardly as compared to said top and front portions.

1 Claim, 7 Drawing Figures

SPEED UP DEVICE FOR BICYCLE

BACKGROUND OF THE INVENTION

The present invention relates to a speed up device for a bicycle, and the main body of said device is formed by shaping an opening on the surface of a triangle shape corresponding to an opposite side of the rotating direction of the wheel and having a cross section of an almost triangular shape hollow chamber and a bottom plate and a reinforcing plate being detachably installed thereon, and when the main body is mounted on the axle, the bottom plate and the reinforcing plate are removed, and while the hollow chamber is in compressed condition, it is fitted into the space formed by the axle and the spokes of the wheel, and then the reinforcing plate and the bottom plate are installed on the speed up body, and the speed up body is arranged to be assembled and installed easily in the space surrounded by the axle and spokes of the wheel and then the swelling volume of the air is greatly increased, producing the increased thrust to the bicycle.

Heretofore, as a speed up device for a bicycle which is designed to increase the speed by receiving a head wind or a tail wind, there is a Japanese utility model registration No. 1,148,681, but this invention is constructed in such a way that a cover plate inclined toward the rear direction is formed over from almost the center portion of the back plate to the rear portion, and a space portion whose front surface is open is provided, and this device is fixed to the spokes of the wheel by means of bolts.

However, this speed up device was constructed in such a way that the device was installed in projecting form on the outer surface of the spokes of the wheel, and for this reason, in order to avoid danger in the area projecting outward of the wheel, the speed up device had to be constructed in small size. As a result, the volume of the speed up device receiving the wind power was small, and as a result, a large number of speed up devices must be installed on both surfaces of the wheel. Such installation was not satisfactory.

SUMMARY OF THE INVENTION

An object of the present invention is to provide a speed up device capable of increasing the rotating force of the wheel by utilizing the wind power of the head wind or tail wind, reducing the traveling resistance, and increasing the speed, when the bicycle is on the run, and it utilizes the principle of the windmill by installing a proper number of speed up devices at equal intervals in the spoke spaces surrounded by the axle and spokes of the wheel.

Another object of the present invention is to provide a speed up device which can be housed and installed in the space between the axle and spokes of the wheel of the bicycle, and the speed up device can be extremely firmly fixed to the spokes, and the device can be installed in the space between the spokes which has so far not been used at all, and moreover there is no projection outside of the wheel, and the device can be installed safely, and the original function of the wheel is not spoiled at all, and no remodelling is needed to the body of the bicycle.

A still further object of the present invention is to permit easy fitting of the speed up device into the vertically long and narrow spoke space by arranging the hollow chamber formed by two side plates so that the bottom plate can be removed to make it thinner, and to subsequently complete assembly of the bottom plate and the reinforcing plate into the speed up device into the spoke space of the wheel, whereby a hollow chamber is formed by of the side plates in swelled and enlarged condition.

DETAILED DESCRIPTION OF THE INVENTION

Figure 1:
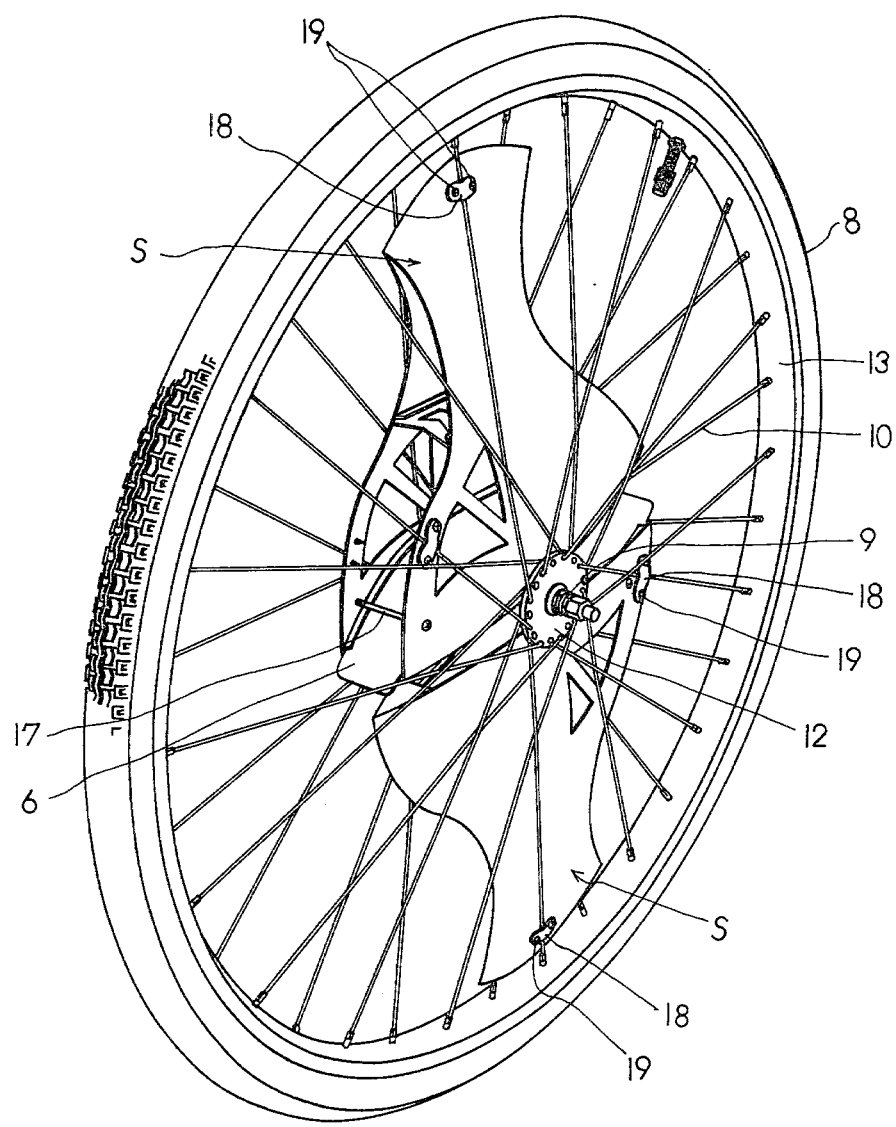
FIG. 1 is a perspective view showing the condition wherein the device is mounted on the wheel.

The speed up device shown by the letter S is formed in such a way that two sheets of side plates 1, 1' are integrally bonded at the top side portions 2 and at the front inclined side portions 3, while the rear inclined side portion 4 and bottom side portion 5 are formed in a spaced apart condition, and a bottom plate 6 is detachably installed on the bottom side portion 5. The device has an ax shape having a triangular cross section provided with a bag like hollow chamber 7 between the side plates 1, 1' is formed. The speed up body S is detachably mounted in the spoke space outwardly from the axle 9 of the wheel 8 of the bicycle B.

Figure 2:
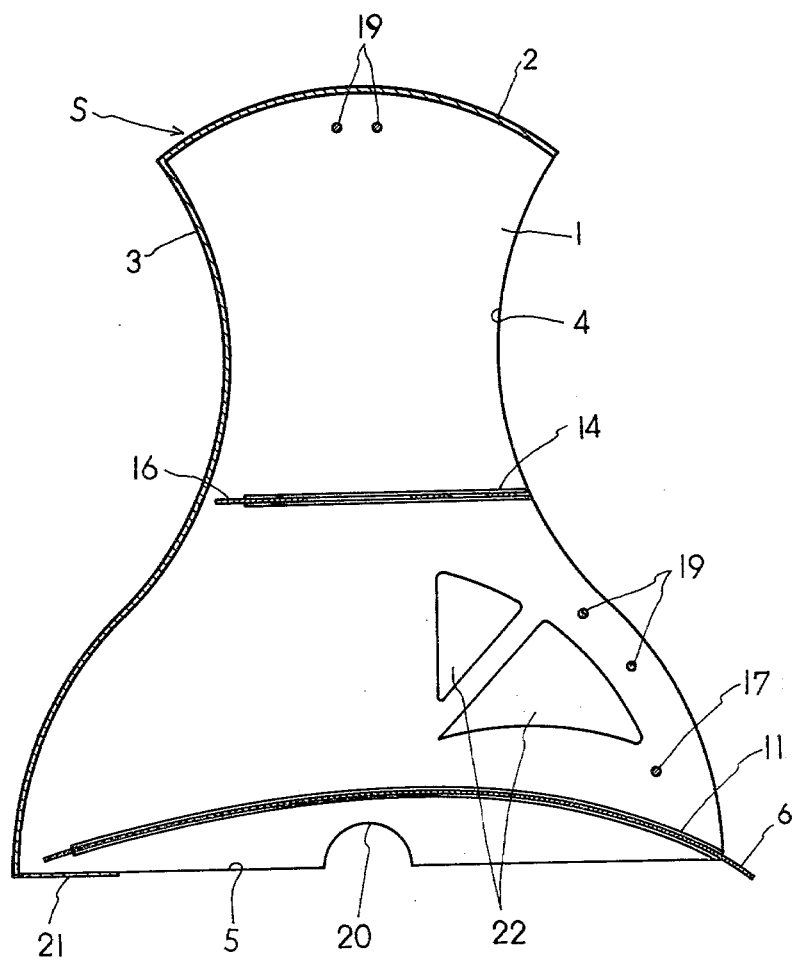
FIG. 2 is a cross section taken along a line II—II of FIG. 4.
Figure 3:
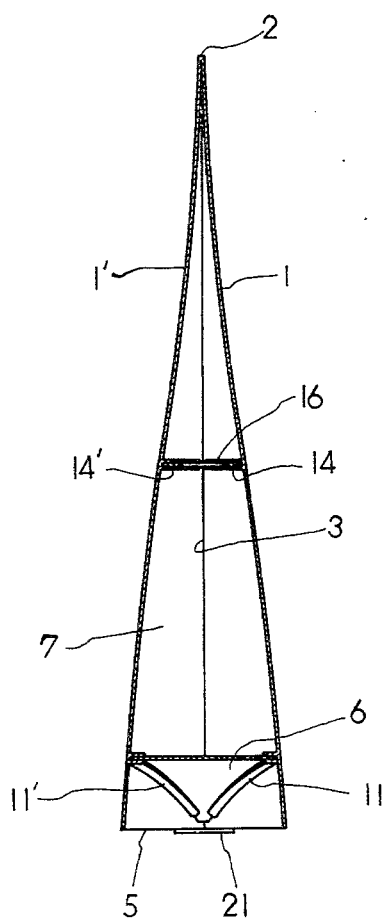
FIG. 3 is a cross section taken along a line III—III of FIG. 4.
Figure 4:
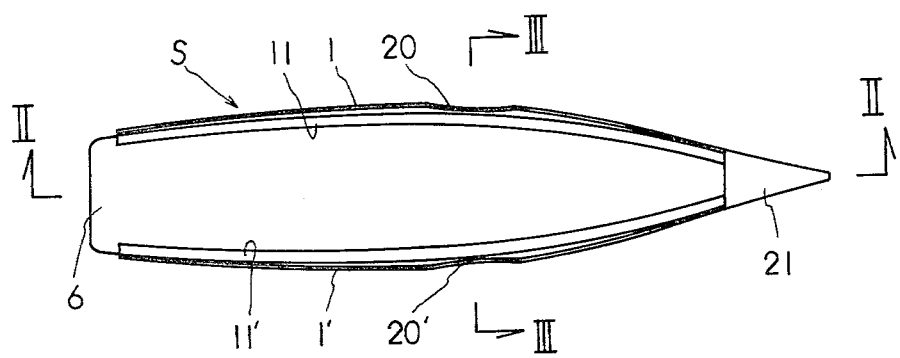
FIG. 4 is a base drawing of the speed up device.
Figure 5:
FIG. 5 is a plan of the bottom plate.

The bottom plate 6 shaped like a ship bottom whose tip is tapered as shown in FIG. 5, and as shown in FIG. 2 through FIG. 4, guide grooves 11 are formed on the inner surface positions of the bottom side portions 5 of the two side plates 1, 1', and the bottom plate 6 is fitted in the guide grooves 11.

When the bottom plate 6 is removed from the speed up body S, the hollow chamber 7 becomes thin and narrow. In this condition, as shown in FIG. 1, it is fitted into the space surrounded by the spokes, and thereafter, when the bottom plate 6 is fitted into the guide grooves 11, the bottom side portions 5 are spread apart. Namely, as shown in FIG. 1, the front inclined side portion 3 is shaped as a tapered edge, and the rear inclined side portion 4 is open in a V-shape and the hollow chamber 7 is enlarged.

Figure 6:
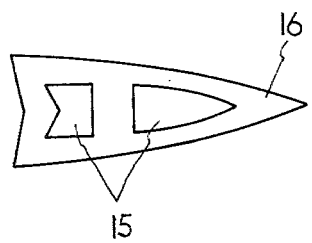
FIG. 6 is a plan of the reinforcing plate.
Figure 7:
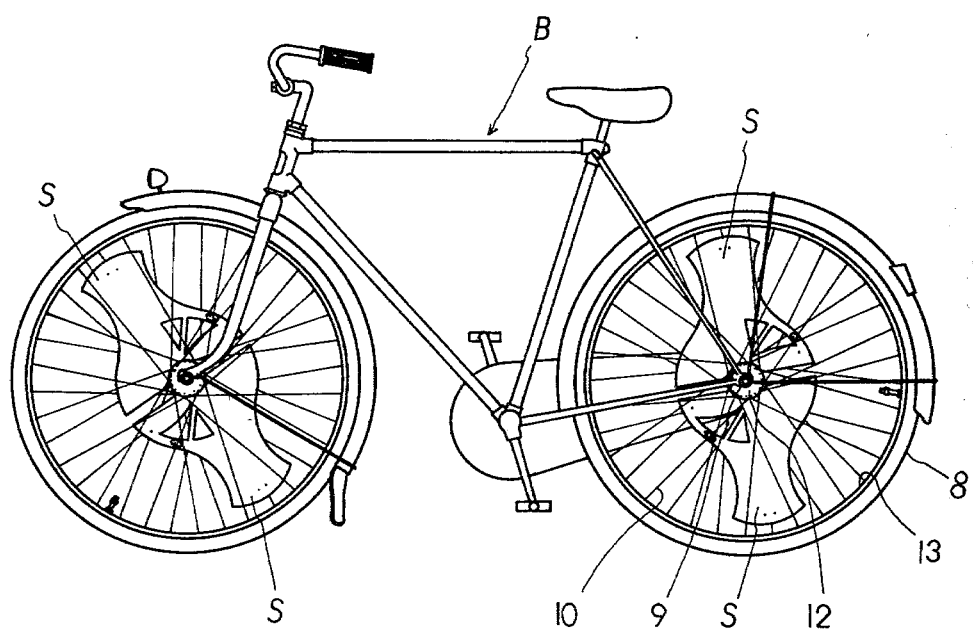
FIG. 7 is a side view of the condition wherein the devices are mounted on the front wheel and rear wheel of the bicycle.

The guide grooves 14, 14' are provided in the horizontal direction on the inner surface of the mid portion of the speed up body S, and as shown in FIG. 6, a reinforcing plate 16 formed with a through hole 15 and a tapered tip is fitted into guide grooves 14, 14', whereby the speed up body S exerts an expanding force outwardly to both sides of the spokes 10 and is mounted tightly in the spoke space. However, the reinforcing plate 16 and the guide grooves 14, 14' are not indispensable items, but merely preferable since they will provide tightness.

The speed up body S is fixed to the spokes 10 by means of the mounting metal fixture 18 and screws 19, so that the body S will not move in the spoke space.

The bottom plate 6 and the auxiliary plate 16 clamp are held in place between the side plates 1, 1' by means of clamping bolt 17.

Also, as shown in FIG. 4, in the center portion of the bottom side portion 5, a notch 20 fitting to the axle 9 is provided, and the angular reinforcing member 21 is integrally provided on the tapered end portion. In the vicinity of the rear inclined side portion 4 of the side plates 1, 1', a window 22 is formed, and it acts to swell the tail wind from the right back and rear aslant direction to the innermost end portion of the hollow chamber 7 of the speed up body S.

Accordingly, the present invention is such that the speed up body S is fitted into the spoke space of the wheel 8 in a condition when the hollow chamber 7 of the speed up body S is made thin and narrow, and then the bottom plate 6 and the auxiliary plate 16 are fitted to the guide grooves 11, 11' and 14, 14', and the hollow chamber 7 of the speed up body S is expanded to its fullest extent in the spoke space. Thereafter, the bottom plate 6 and the auxiliary plate 16 are fixed in place by means of the clamping body 17, and then the bolt S is fixed in the spoke space by means of the mounting plate 18 and the screws 19. As described in the foregoing, the speed up body S can be easily and simply assembled and disassembled, and as a result, the operation of installing the speed up body S is extremely easy, and the installation is firm and sturdy, and it enables the swelling of the tail wind positively into the hollow chamber 7 of the speed up body S, and the tail wind is converted positively into thrust for the bicycle. Therefore, when the speed up body is mounted on the bicycle, it can prevent the consumption of traveling energy of the bicycle as much as possible by utilizing the wind power. Furthermore, the present invention can be manufactured at a low cost and the number of components is small.

What is claimed is:

1. In the known combination of a bicycle wheel that includes a rim, an axle and two sets of spokes extending from opposite ends of said axle outwardly toward said rim, the improvement which comprises:

(a) at least two devices located within said rim, around said axle and between said two sets of spokes,
(b) each said device including a pair of axe-shaped sheet members positioned in opposed relationship with each other with
  portions of said sheet members being joined together at their edge portions, and
  other portions of said sheet members being spaced apart with respect to each other,
(c) the bottom edge of each sheet member being disposed adjacent the axle of the wheel,
(d) the top edge of each sheet member being disposed adjacent the rim of the wheel,
(e) each sheet member having spaced apart side edges that extend between said top and bottom edges,
(f) the top edges of each pair of opposed sheet members being joined together so as to essentially form an elongated outer edge,
(g) one of the two pairs of opposed side edges of each pair of opposed sheet members being joined together so as to form a leading side edge,
(h) guide grooves located along the bottom edge of each sheet member,
(i) a spacing member mounted in said guide grooves intermediate each pair of opposed sheet members, which spacing member is shaped so that when it is inserted in said guide grooves it
  causes one of said two pair of side edges of opposed sheet members to be spread apart with respect to each other, and
  causes the other of said two pair of side edges of opposed sheet members to converge with respect to each other, and
(j) mounting means for securely mounting each said device in a position between said two sets of spokes,
(k) each said device being widest near the axles, somewhat less wide near the rim and narrowest at a point intermediate the rim and said axle.

* * * * *